United States Patent [19]

Demircan

[11] Patent Number: 4,936,714

[45] Date of Patent: Jun. 26, 1990

[54] VALVE DEVICES FOR USE WITH MINING EQUIPMENT

[75] Inventor: Bayramali Demircan, Bergkamen-Rünthe, Fed. Rep. of Germany

[73] Assignee: Gewerkschaft Eisenhutte Westfalia GmbH, Lunen, Fed. Rep. of Germany

[21] Appl. No.: 316,289

[22] Filed: Feb. 27, 1989

[30] Foreign Application Priority Data

Mar. 3, 1988 [DE] Fed. Rep. of Germany ....... 3806833

[51] Int. Cl.[5] ...................... E21D 23/16; F16K 31/122

[52] U.S. Cl. .................................... 405/302; 137/494; 137/508; 137/509

[58] Field of Search ........................ 137/494, 508, 509; 91/170 MP; 405/289–302

[56] References Cited

U.S. PATENT DOCUMENTS

| | | | |
|---|---|---|---|
| 3,410,304 | 11/1968 | Paul | 137/494 |
| 4,074,695 | 2/1978 | Weirich et al. | 137/508 |
| 4,552,488 | 11/1985 | Elliott-Moore | 405/299 |
| 4,572,709 | 2/1986 | Weirich et al. | 405/302 |
| 4,580,594 | 4/1986 | Petts | 405/302 X |
| 4,716,928 | 1/1988 | Kussel et al. | 137/494 |

FOREIGN PATENT DOCUMENTS

| | | | |
|---|---|---|---|
| 1200089 | 9/1965 | Fed. Rep. of Germany | 137/509 |
| 2636794 | 3/1977 | Fed. Rep. of Germany . | |
| 1650351 | 8/1979 | Fed. Rep. of Germany | 137/509 |
| 2914981 | 10/1980 | Fed. Rep. of Germany . | |
| 1222473 | 6/1960 | France | 137/509 |
| 1024524 | 3/1966 | United Kingdom | 137/509 |

*Primary Examiner*—Dennis L. Taylor
*Assistant Examiner*—John A. Ricci
*Attorney, Agent, or Firm*—Samuels, Gauthier & Stevens

[57] ABSTRACT

A pressure-relief valve device employs a connector welded to the base of mining equipment equipment such as an hydraulic prop, so as to communicate with the pressure fluid in a working chamber thereof. A housing is screwed into the connector and the connector has an outflow passage leading to the surroundings. A valve composed of a fixed valve seating and a movable closure member opens and closes communication between the working chamber and the outflow passage. A spring holds the valve closure member on the seating. The valve closure member is slidably guided on part of a tappet subjected to spring force. The tappet has a piston exposed to the pressure fluid which opposes the spring force. If excess pressure occurs the tappet moves against the spring force and lifts the closure member off the seating. Once the pressure drops the tappet moves back under the action of the spring but the closure member can move more slowly to gently re-establish the valve action.

9 Claims, 2 Drawing Sheets

VALVE DEVICES FOR USE WITH MINING EQUIPMENT

FIELD OF THE INVENTION

The present invention relates to pressure-relief valve devices for use with mining equipment, particularly hydraulic props of roof supports, in underground mine workings.

BACKGROUND OF THE INVENTION

Valve devices are widely used in mine workings to protect equipment against excess pressure. It is usual in mining equipment to adopt as the pressure fluid an emulsion containing about 97% water. Such a pressure fluid medium is relatively safe. In the case of roof supports, the associated pressure-relief valve devices have to cope with sudden explosive-like stress relief phenomena which occur in roofs of longwall mine workings when the roof can collapse, even partially, in a fraction of a second. Customary valve devices such as described in DE No. 2914981 are not capable of responding to and resisting such conditions. Special valves termed "rock burst valves" have been developed to provide the maximum possible pressure fluid outflow cross-section with the minimum delay. Such valves do not re-close until pressure in the working chamber of the prop has dropped below the predetermined relief pressure.

DE No. 2636794 describes a pressure-relief valve which has a spring-loaded tappet provided with two pistons acting in opposite directions actuated by pressure fluid in a working chamber. The piston which acts in the direction to close the valve has a smaller working area than the other piston which acts in the direction to open the valve. The valve then opens when the pressure exceeds a pre-determined threshold level set by the spring force and the relative piston working areas. The valve surfaces are provided on a fixed valve spring and a movable valve closure member. The seating is often made from plastics while the closure member and other components are made from steel. Plastics seatings are particularly resistant to dirt particles which inevitably contaminate the pressure fluid but nevertheless these seatings are sensitive to impact force. Such impact force occurs mostly when the closure member returns under spring force to re-establish the valve seating action. Repeated impacts causes premature wear in the seatings.

A general object of the invention is to provide an improved form of valve device for the aforementioned application which will provide an ample outflow of pressure fluid rapidly in the case of excess pressure yet protects the valve seating from damage on closure.

SUMMARY OF THE INVENTION

A pressure-relief or rock burst valve device constructed in accordance with the invention has a spring loaded valve tappet guided for displacement in a housing. The tappet is sealed relative to the housing with an O-ring and has a shaft or rod portion on which a spring loaded valve closure member or sleeve is displaceably guided. The valve tappet is designed to lift the valve closure member off its seating rapidly when excess pressure prevails but when the tappet returns under the spring force the movement of the closure member is damped since the rod portion can move through the closure member as the latter is gently returned by its own spring force. In this way impact forces between the closure member and the seating are reduced. The central region of the valve tappet is conveniently provided with a piston carrying a O-ring which slidably seals against a wall surface of the housing and a similar seal is preferably provided between the valve closure member and the rod portion of the tappet.

The housing contains a chamber which exposes the piston to the pressure of the equipment to be protected. Conveniently, the housing is fitted to a connector which provides connection bores leading to the valve. One of these bores connects the working chamber of the chamber to be protected to the chamber in the housing while the other bore leads to atmosphere. Preferably the working area of the piston on the tappet is greater than that of the face or faces of the valve closure member which is or are exposed to the pressure in the housing chamber and act in the opposite direction to force the closure member onto the seating. The force on the piston of the tappet opposes the spring force acting on the tappet and overcomes this force when the pressure rises beyond the threshold level.

It is possible to alter the function of the valve device by reversing the flow of pressure fluid to produce a so-called pre-stressing valve. The pre-stressing pressure can then be selected by the force of the spring acting on the closure member.

In a preferred construction the invention provides a pressure-relief or rock-burst valve device for use with mining equipment; said valve device comprising a housing, a chamber defined at least partly in the housing, first connection means for establishing connection between the chamber of the device and a pressure chamber of the mining equipment which is to be protected against excess pressure, second connection means for establishing connection between the device and the atmosphere, a valve seating fixed in relation to the housing, a valve closure member displaceable in relation to the housing, the valve seating and the valve closure member having interengageable mating surfaces which provide a valve which can open and close communication between the first and second connection means via the chamber, a spring for biasing the closure member against the seating to close the valve, a tappet guided for displacement in the housing, a piston on the tappet which is exposed to the prevailing pressure in the chamber, a spring acting on the tappet to oppose the force produced by the pressure on the piston and a rod portion on the tappet on which the valve closure member is displaceably guided and stop means which causes the valve closure member to move away from the seating to open the valve when the force on the piston exceeds the opposing force on the spring to displace the tappet.

In another aspect, the invention provides a prestressing valve device comprising a housing containing a displaceable valve tappet, a spring acting on the valve tappet, a piston on the tappet subjected to pressure in opposition to the spring force, a seal between the tappet and the housing, a rod portion on the valve tappet, a valve composed of a fixed seating and a displaceable closure member, the closure member being displaceably guided on the rod portion of the valve tappet, a further spring for biasing the valve closure member against the seating and connection means leading to the valve providing a pre-stressing pressure defined by the force of the further spring.

The invention may be understood more readily, and various other aspects and features of the invention may become apparent, from consideration of the following description.

BRIEF DESCRIPTION OF THE DRAWINGS

An embodiment of the invention will now be described, by way of example only, with reference to the accompanying drawings, wherein.

DESCRIPTION OF PREFERRED EMBODIMENT

Figure 1:
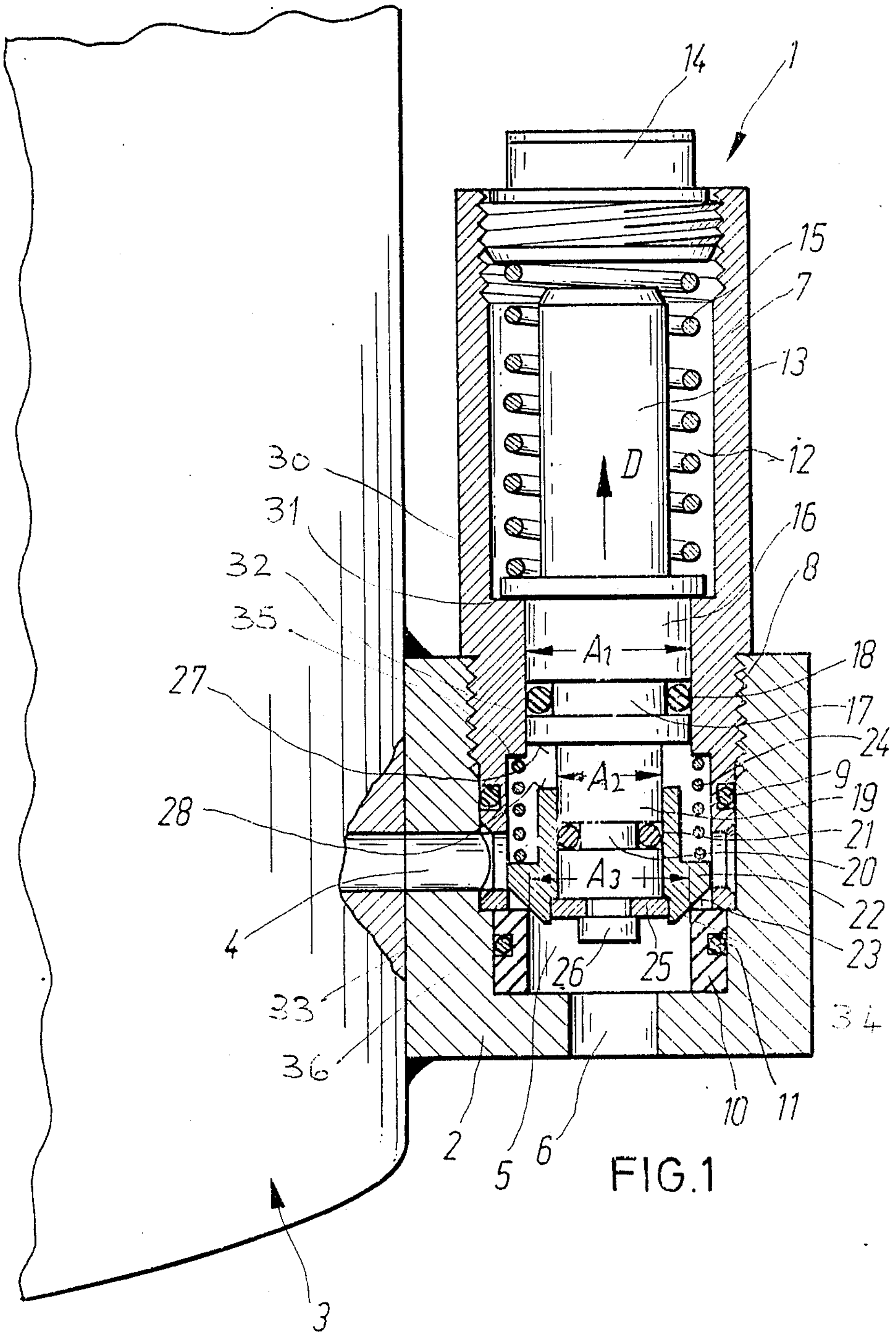
FIG. 1 is a sectional side view of a valve device constructed in accordance with the invention.
Figure 2:
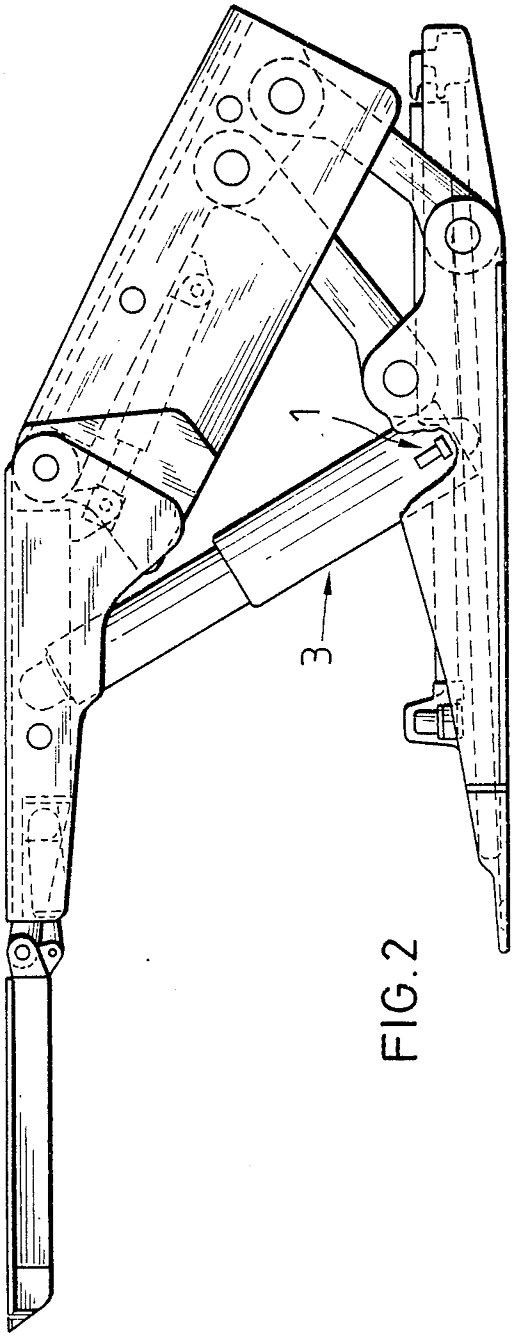
FIG. 2 is a schematic side view of a roof support equipped with the valve device shown in FIG. 1.

As shown in FIG. 2 a valve device 1 constructed in accordance with the invention is installed at the base of an hydraulic prop 3 of a mine roof support. The valve device 1, shown in detail in FIG. 1, is mounted on a connector 2 conveniently welded to the base of the prop 3. The connector 2 has a stepped bore 5 leading to bores 4, 6. The bore 4 leads to a bore in the base of the prop 3 communicating with the working chamber of the prop 3. The bore 6 leads directly to atmosphere. A valve seating 10 is mounted in the lower portion of the bore 5 and a sealing ring 11 is fitted in a groove in the outer periphery of the seating 10 to engage on the wall surface of the lower portion of the bore 5. A cartridge-like housing 7 is provided with an external screw thread 8 which mates with a screw-thread in the upper portion of the bore 5. A sealing ring 9 is fitted in a groove in the outer periphery of the lower end region of the housing 7 to engage with a wall portion of the bore 5. Instead of having a screw-threaded connection between the housing 7 and the connector 2 it is possible to adopt some other detachable connection means such as a spring coupling or a clamp. The housing 7 itself has a stepped through bore 12 closed at the upper end with a plug 14 conveniently screwed into the upper region of the bore 12. A valve tappet 13 is located in the bore 12 for longitudinal displacement. The tappet 13 is provided with a flange 30 which abuts on a shoulder 31 of the bore 12. A compression spring 15 is disposed between the flange 30 and the plug 14 and holds the flange 30 against the shoulder 31. The central region of the tappet 13 takes the form of a piston 16 provided with a sealing ring 18 in an annular groove 17 which engages on a wall surface 32 of the bore 12. The lower region of the tappet 13 takes the form of a rod 19 also having a sealing ring 21 in an annular groove 20. The rod 19 is slidably received in a valve closure member 22 located in a chamber 33 open to the bore 4. This valve member 22 takes the form of a sleeve with a flange 34 provided with a frusto-conical lower valve surface 23 which engages with a complementary valve surface of the seating 10. These mating valve surfaces provide a valve which opens and closes communication between the bores 6, 4 of the connector 2 via the chamber 33. A compression spring 24 locates between the upper face of the flange 34 of the valve member 22 and a shoulder 35 of the bore 12 and biases the valve surfaces into sealing contact. A disc-like stop piece 25 is adjustably secured as by a screw 26 to the lower end face of the rod 19 and engages in a counter-bored recess 36 in the valve member 22. The movement of the valve member 22 along the rod 19 is delimited by the stop piece 25 in one direction and by the engagement of the end face 28 of the valve member 22 with the piston 16 in the other direction.

The working face 27 of the piston is slightly greater in area than the end face 28. Preferably the diameter of the piston $A_1$ is greater than the means diameter $A_3$ of the contact sealing pressure of the valve surfaces. $A_2$ denotes the smaller diameter of the rod 19.

During use, the pressure in the prop chamber prevails in the chamber 33 of the device and subjects the piston 16 to a force D opposite the force of the spring 15. Should the pressure in the prop chamber rise beyond a pre-determined safe limit, as for example when there is a collapse of the roof of the mine working, the force D increases to overcome the spring force and displace the valve tappet 13 upwardly. The stop piece 25 immediately raises the valve member 22 with the tappet 13 to open the valve and permit outflow of pressure fluid through the bores 4, 6 to relieve the excess pressure. When the pressure had decreased sufficiently the tappet 13 is displaced downwardly by the spring 15. The resultant movement of the valve member 22 is however damped and relative movement can occur between the rod 19 and the valve member 22. The valve member 22 is gently returned by the force of the spring 24. The valve seating 10 is no longer subjected to damaging impact force as the valve surfaces mate to close the valve again.

The function of the valve device can be altered to that of a pre-stressing valve by using the bore 6 to subject the device to pre-stressing pressure in opposition to the spring 24. The bore 4 then forms the valve outlet.

I claim:

1. A pressure relief valve device for use with mining equipment; said valve device comprising a housing, a chamber defined at least partly in the housing, first connection means for establishing connection between the chamber of the device and a pressure chamber of the mining equipment which is to be protected against excess pressure, second connection means for establishing connection between the device and the atmosphere, a valve seating fixed in relation to the housing, a valve closure member displaceable in relation to the housing, the valve seating and the valve closure member having interengageable mating surfaces which provide a valve which can open and close communication between the first and second connection means via the chamber, a first spring for biasing the closure member against the seating to close the valve, a tappet guided for displacement in the housing, a piston on the tappet which is exposed to the prevailing pressure in the chamber, a second spring acting on the tappet to oppose the force produced by the pressure on the piston, a rod portion on the tappet on which the valve closure member is displaceably guided, and stop means for causing the valve closure member to move as a unit with the tappet away from the seating to open the valve when the force on the piston exceeds the opposing force of the first and second springs to displace the tappet, and for permitting the tappet to move in relation to the valve closure member towards the valve seating when the force on the piston is less than the opposing force of the second spring, thereby permitting the valve closure member to be returned against the seating by the force of the first spring.

2. A valve device according to claim 1, wherein the housing has a stopped bore receiving the tappet and a sealing ring is provided between the rod portion of the tappet and the valve closure member.

3. A valve device according to claim 2, wherein a sealing ring is provided between the piston and a wall surface of the bore.

4. A valve device according to claim 1, wherein a connector is fitted to the mining equipment and defines the first and second connection means.

5. A valve device according to claim 4, wherein the valve seating and the housing are separately mounted in the connector.

6. A valve device according to claim 5, wherein sealing rings are provided to seal the housing and the seating relative to the connector.

7. A valve device according to claim 1, wherein the valve closure member has at least one face open to the chamber and the piston has a working face open to the chamber larger in area than said at least one face of the valve closure member.

8. In or for mining equipment provided with a working chamber exposed to pressure fluid, a pressure-relief valve device comprising a connector fixed to the equipment and defining a first passageway leading to the working chamber and a second passageway leading to the atmosphere, a housing detachably fixed to the connector, a valve with a valve closure member operative to open or close communication between the passageways, a piston guided for displacement in the housing and exposed to the pressure in the working chamber and a spring opposing the action of the piston and tending to maintain the valve closed wherein the piston is formed on a valve tappet, a ring seal serves to seal the tappet relative to the housing and a rod portion of the tappet slidably engages in the valve closure member and forces the latter to move in the opening direction of the valve.

9. A pressure relief valve device for use with mining equipment; said valve device comprising a housing, a chamber defined at least partly in the housing, first connection means for establishing connection between the chamber of the device and a pressure chamber of the mining equipment which is to be protected against excess pressure, second connection means for establishing connection between the device and the atmosphere, a valve seating fixed in relation to the housing, a valve closure member displaceable in relation to the housing, the valve seating and the valve closure member having interengageable mating surfaces which provide a valve which can open and close communication between the first and second connection means via the chamber, a spring for biasing the closure member against the sealing to close the valve, a tappet guided for displacement in the housing, a piston on the tappet which is exposed to the prevailing pressure in the chamber, a spring acting on the tappet to oppose the force produced by the pressure on the piston and a rod portion on the tappet on which the valve closure member is displaceably guided and stop means which causes the valve closure member to move away from the seating to open the valve when the force on the piston exceeds the opposing force on the spring to displace the tappet, said stop means comprising a disc secured to the end of the rod portion of the tappet and fitting in a recess in the valve closure member.

* * * * *